United States Patent
Sakuragi

(10) Patent No.: US 8,907,949 B2
(45) Date of Patent: Dec. 9, 2014

(54) IMAGE DISPLAY APPARATUS, METHOD AND PROGRAM

(71) Applicant: FUJIFILM Corporation, Tokyo (JP)

(72) Inventor: Futoshi Sakuragi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/775,770

(22) Filed: Feb. 25, 2013

(65) Prior Publication Data

US 2013/0169640 A1 Jul. 4, 2013

Related U.S. Application Data

(63) Continuation of application No. PCT/JP2011/004594, filed on Aug. 16, 2011.

(30) Foreign Application Priority Data

Aug. 23, 2010 (JP) .................. 2010-185880

(51) Int. Cl.
G06T 17/00 (2006.01)
G06T 19/20 (2011.01)
G06T 15/20 (2011.01)
G06T 15/00 (2011.01)
G06T 7/60 (2006.01)

(52) U.S. Cl.
CPC ....... *G06T 15/00* (2013.01); *G06T 2207/30004* (2013.01); *G06T 19/20* (2013.01); *G06T 15/20* (2013.01); *G06T 2207/10072* (2013.01); *G06T 7/606* (2013.01); *G06T 2219/2016* (2013.01)
USPC ........................................ 345/424

(58) Field of Classification Search
CPC ............. G06T 2207/10072; G06T 2219/2016; G06T 7/606
See application file for complete search history.

(56) References Cited

U.S. PATENT DOCUMENTS

| 5,644,689 A | 7/1997 | Ban et al. |
| 5,940,527 A | 8/1999 | Takeo |

(Continued)

FOREIGN PATENT DOCUMENTS

| JP | 3-094389 | 4/1991 |
| JP | 5-123327 | 5/1993 |

(Continued)

OTHER PUBLICATIONS

K.Kubota et al., "Evaluation of Computer-Aided Diagnosis system for Lung Cancer based on Helical CT images", Technical Report of IEICE, vol. 101, No. 310, pp. 41-46, 2001.

(Continued)

*Primary Examiner* — Xiao Wu
*Assistant Examiner* — Wynton S Jones
(74) *Attorney, Agent, or Firm* — Young & Thompson

(57) ABSTRACT

A projection image is generated from a three-dimensional image by projecting an observation target in a predetermined projection direction. The generated projection image is displayed at a center of a display screen of a display device. A region extending in the predetermined projection direction from a central part of the display screen is set as set region, and at least a part of an overlapped region between the set region, which has been set, and the observation target is determined, as rotation center candidate region. Center of rotation is determined in the determined rotation center candidate region or in the vicinity thereof.

10 Claims, 6 Drawing Sheets

(56) References Cited

U.S. PATENT DOCUMENTS

| | | |
|---|---|---|
| 2002/0181754 A1 | 12/2002 | Masumoto et al. |
| 2003/0095692 A1 | 5/2003 | Mundy et al. |
| 2005/0010100 A1 | 1/2005 | Hornegger et al. |
| 2007/0206030 A1 | 9/2007 | Lukis |
| 2009/0010520 A1 | 1/2009 | Wang |
| 2011/0006981 A1* | 1/2011 | Chtchetinine et al. ........ 345/157 |

FOREIGN PATENT DOCUMENTS

| | | |
|---|---|---|
| JP | 5-189541 | 7/1993 |
| JP | 7-141523 | 6/1995 |
| JP | 07141523 A * | 6/1995 |
| JP | 8-215183 | 8/1996 |
| JP | 10-097624 | 4/1998 |
| JP | 2001-137230 | 5/2001 |
| JP | 2001-283191 | 10/2001 |
| JP | 2002-345807 | 12/2002 |
| JP | 2003-225231 | 8/2003 |
| JP | 2003-271924 | 9/2003 |
| JP | 2004-141612 | 5/2004 |
| JP | 2004-329929 | 11/2004 |
| JP | 2008-043564 | 2/2008 |
| JP | 2008125881 A * | 6/2008 |
| JP | 2008-253293 | 10/2008 |
| JP | 2009-011564 | 1/2009 |
| JP | 2011-139821 | 7/2011 |

OTHER PUBLICATIONS

S. Kido et al., "Intelligent CAD for diffuse lung diseases", Grant-in-Aid for Scientific Research, granted by the Ministry of Education, Culture, Sports, Science and Technology, Study in Specific Field, "Intellectual Diagnosis Aid of Multi-Dimensional Medical Images", Proceedings of 4th Symposium, pp. 45-54, 2007.

Y. Wakida et al., "Liver Cancer Detection based on a Temporal Density Feature from Abdominal Dynamic X-ray CT Images", Proceedings of Journal of Cumputer Aided Diagnosis of Medical Images, vol. 10, No. 1, pp. 1-10, 2007.

H. Fujita et al., "Intelligent Computer-aided Diagnosis Based on Normal Structure Recognition of Human Body", Grant-in-Aid for Scientific Research, granted by the Ministry of Education, Culture, Sports, Science and Technology, Study in Specific Field, "Intellectual Diagnosis Aid of Multi-Dimensional Medical Images", Proceedings of 4th Symposium, pp. 55-60, 2007.

Extended European Search Report (EESR) dated May 9, 2014; Application No. 11819566.8.

NPL: Rotating A Model in 3D: Suggestions for center of rotation. Question and 3 Answers from stackoverflow.com.

* cited by examiner

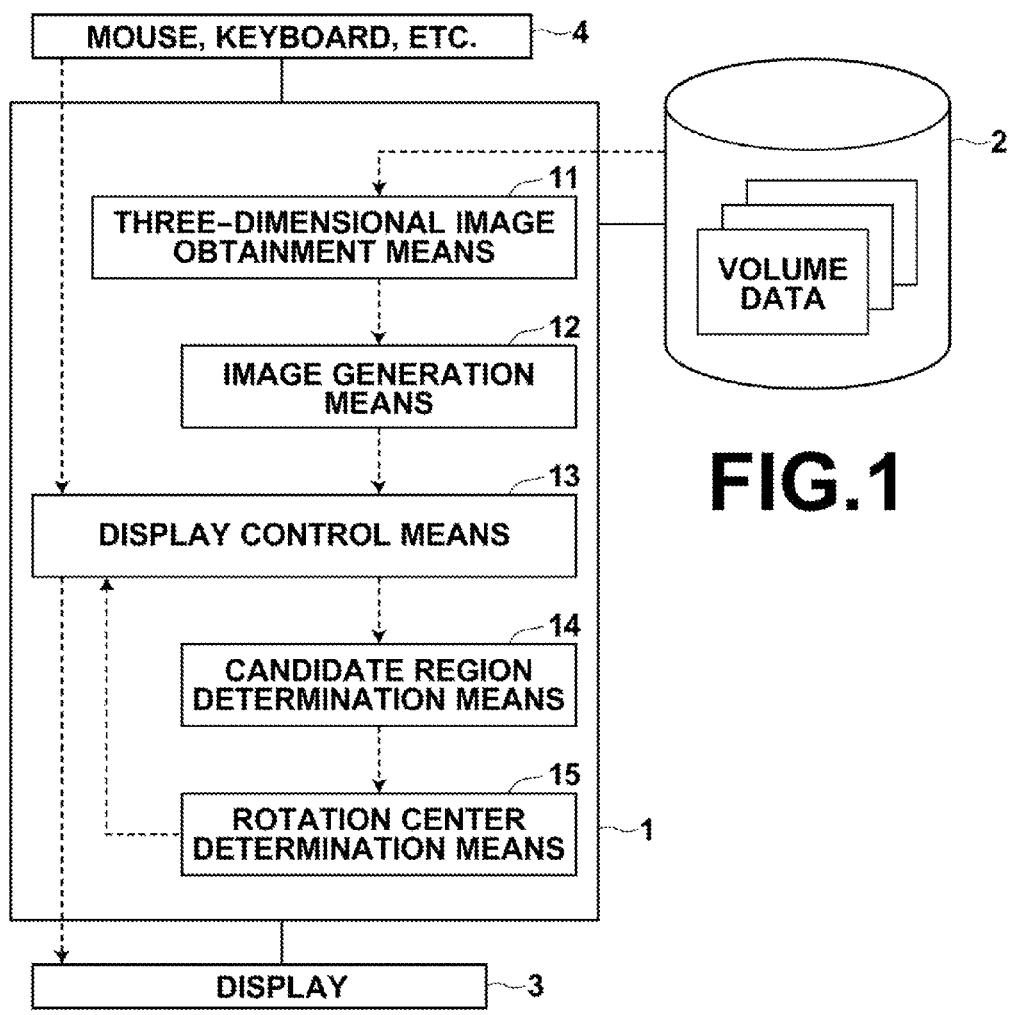

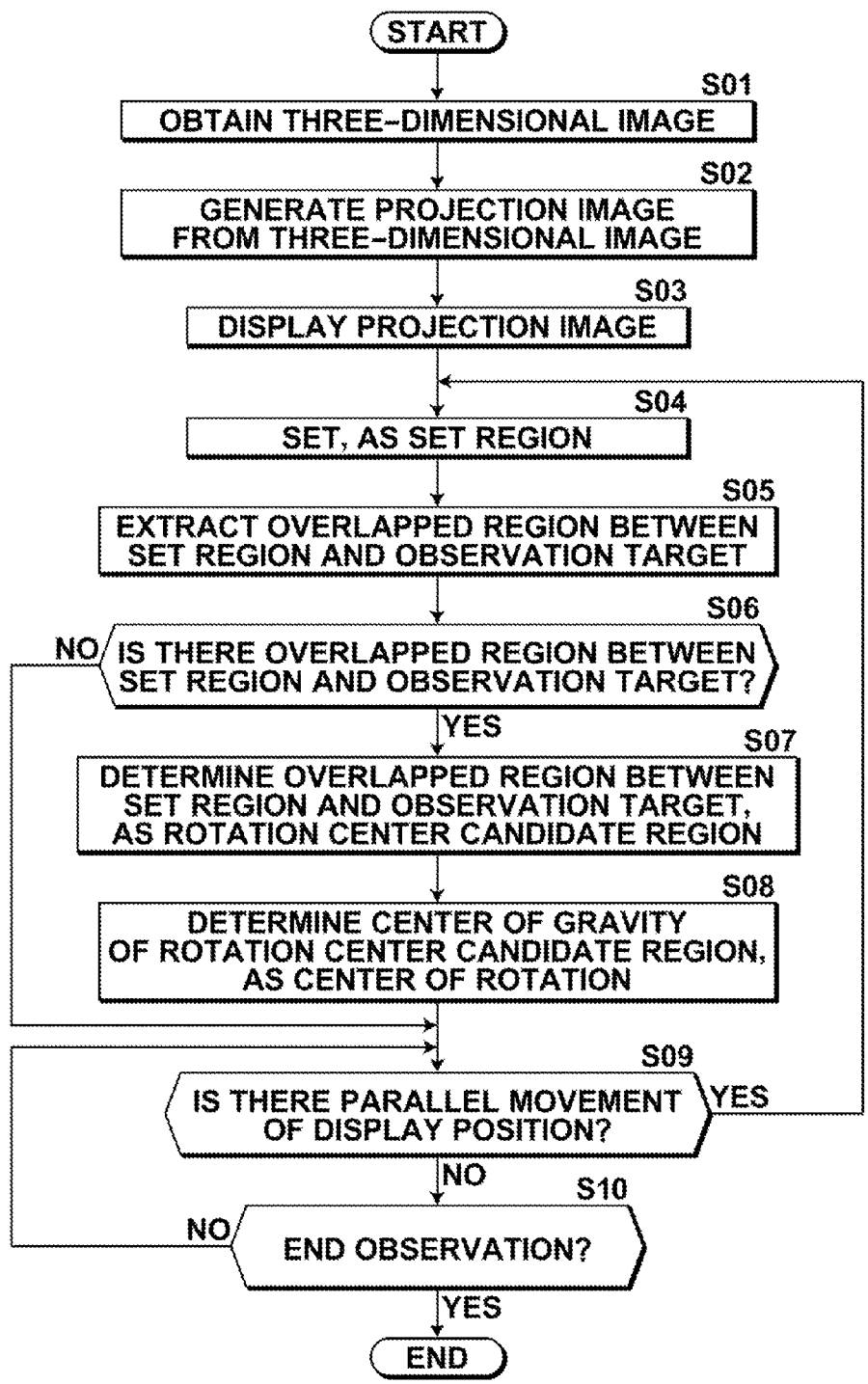

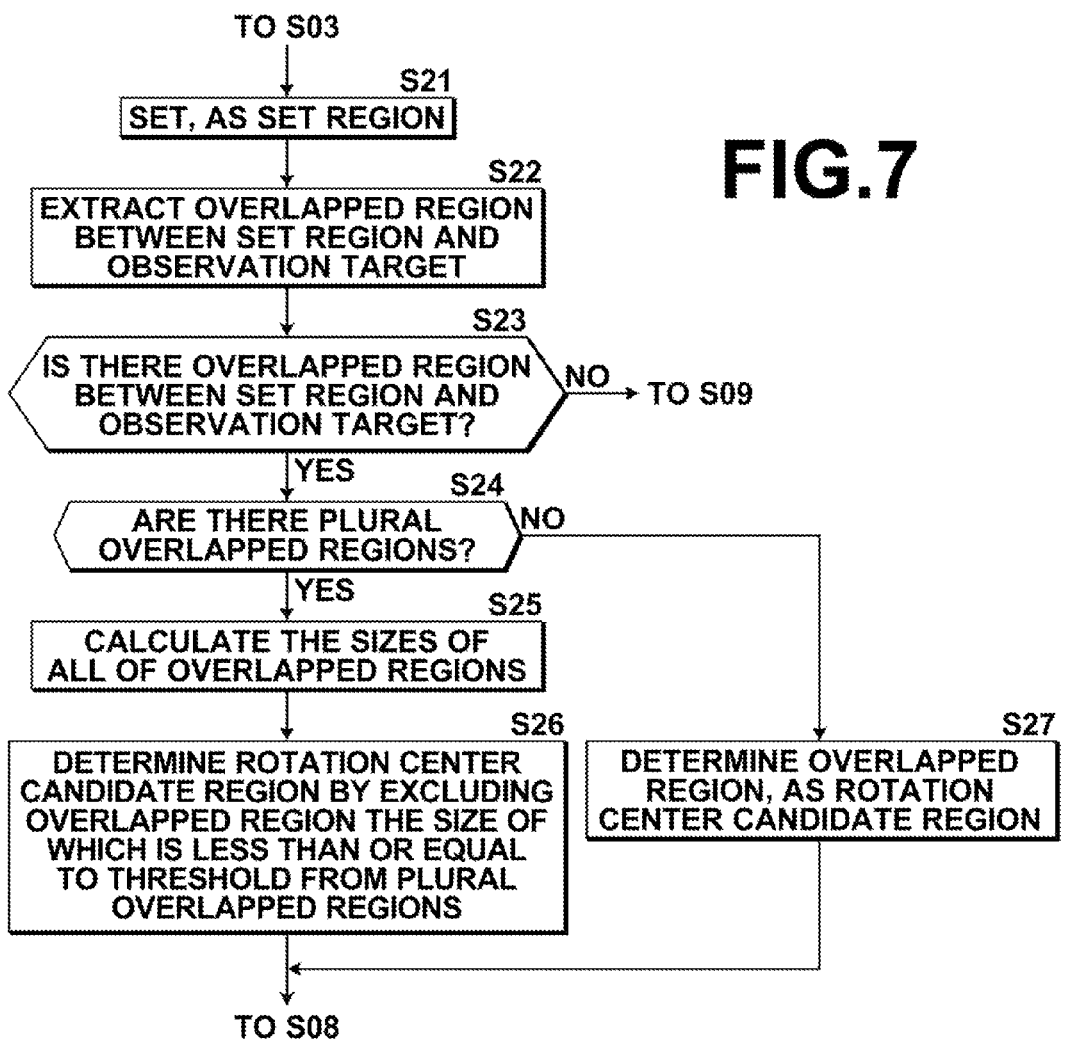

IMAGE DISPLAY APPARATUS, METHOD AND PROGRAM

BACKGROUND OF THE INVENTION

1. Field of the Invention

The present invention relates to an image display apparatus, and particularly to a technique for determining a center of rotation for rotating a three-dimensional image representing an observation target to display a rotated image.

2. Description of the Related Art

An advance of image processing techniques in recent years made it possible to generate projection images by projecting a three-dimensional image from various angles by using various image generation methods, such as a volume rendering method and a surface rendering method. Further, the generated images are displayed on a display screen, as images in which an observation target in the three-dimensional image has been moved, enlarged, rotated or the like, by a user's operation on the display screen by a mouse or the like, and they assist the user in three-dimensionally recognizing the observation target.

Conventionally, when an observation target in such a three-dimensional image is rotated at various angles and displayed, it has been necessary to determine a center of rotation in the observation target in advance, or to determine centers of rotation of the observation target in plural projection images, which were projected in at least two different directions, by user's manual operations.

Japanese Unexamined Patent Publication No. 2009-011564 (Patent Document 1) discloses a method for image-based diagnosis in medical fields. In the method, when a region to be displayed is selected, centers of gravity are calculated, as centers of rotation, for all parts in the selected region, respectively. Further, a rotation axis and a viewpoint are determined with reference to a table in which the direction of a rotation axis and the direction of a view line have been set in advance for each anatomical region. Consequently, rotated display is performed appropriately for a region.

However, in the method disclosed in Patent Document 1, or in the method in which centers of rotation are determined by user's manual operations in two-dimensional images reconstructed from at least two different angles, it is impossible to omit manual work for setting a rotation axis and a viewpoint in advance to determine a center of rotation for displaying a rotated anatomical region on a display screen.

Further, in the method in which a center of rotation of an observation target is determined in advance, it is impossible to satisfy a demand of a user who wants to display an observation target in such a manner that a specific region of interest in the observation target is a center.

SUMMARY OF THE INVENTION

In view of the foregoing circumstances, it is an object of the present invention to provide a rotation center determination apparatus, method and program that makes rotated display based on a center of rotation appropriate for an observation target in a three-dimensional image possible in an image display apparatus.

An image display apparatus of the present invention is an image display apparatus comprising:

a three-dimensional image obtainment means that obtains a three-dimensional image representing an observation target;

an image generation means that generates a projection image from the three-dimensional image by projecting the observation target in a predetermined projection direction;

a display control means that displays the generated projection image at a center of a display screen of a display device;

a candidate region determination means that sets, as a set region, a region extending in the predetermined projection direction from a central part of the display screen, and that determines, as a rotation center candidate region, at least a part of an overlapped region between the set region, which has been set, and the observation target; and a rotation center determination means that determines a center of rotation in the determined rotation center candidate region or in the vicinity thereof.

A rotation center determination method of the present invention in an image display apparatus is a rotation center determination method comprising the steps of:

obtaining a three-dimensional image representing an observation target;

generating a projection image from the three-dimensional image by projecting the observation target in a predetermined projection direction;

displaying the generated projection image at a center of a display screen of a display device;

setting, as a set region, a region extending in the predetermined projection direction from a central part of the display screen, and determining, as a rotation center candidate region, at least a part of an overlapped region between the set region, which has been set, and the observation target; and determining a center of rotation in the determined rotation center candidate region or in the vicinity thereof.

An image display program of the present invention is an image display program for causing a computer to function as:

a three-dimensional image obtainment means that obtains a three-dimensional image representing an observation target;

an image generation means that generates a projection image from the three-dimensional image by projecting the observation target in a predetermined projection direction;

a display control means that displays the generated projection image at a center of a display screen of a display device;

a candidate region determination means that sets, as a set region, a region extending in the predetermined projection direction from a central part of the display screen, and that determines, as a rotation center candidate region, at least a part of an overlapped region between the set region, which has been set, and the observation target; and a rotation center determination means that determines a center of rotation in the determined rotation center candidate region or in the vicinity thereof.

In the present invention, the three-dimensional image may be reconstructed from many tomographic images obtained by tomography or the like, or virtually generated by CG. Further, the observation target may be anything as long as it can be represented as a three-dimensional image. For example, the observation target may be a human body, an animal or a plant, a geometric figure, a structure, such as a building and a machine, a landform, such as a three-dimensional map, or the like.

Further, the projection image may be any image as long as a three-dimensional image is projected in a predetermined projection direction by obtaining intersections between a projection plane and view lines extending from a predetermined viewpoint toward voxels constituting the three-dimensional image, respectively. For example, the projection image may be obtained by applying various projection methods, such as NIP (maximum intensity projection) method. The projection image may be represented by various known reconstruction methods. It is desirable that the projection image is a pseudo three-dimensional image, such as a volume rendering image generated by using a volume rendering method or a surface rendering image generated by using a surface rendering. Further, the predetermined viewpoint of the projection image may be present at infinity from the projection plane.

In the present invention, the term "region" means a three-dimensional region. The three-dimensional region may include a point, a straight line, a plane, and a solid as long as it has a three-dimensional size.

Further, in the present invention, the phrase "a central part of a display screen" means a region in the vicinity of a central point of the display screen, and the region is a circle, a polygon, an ellipse, or the like that has a predetermined size. It is desirable that the central part of the display screen includes the central point. The central part of the display screen may be a point consisting of only the central point. It is desirable that the central part is, for example, a circle or an ellipse with its center located at the central point of the display screen, and the area of the central part is less than or equal to ¼ of that of the display screen. It is more desirable that the central part is a circle or an ellipse the area of which is less than or equal to ⅕ of that of the display screen.

Further, the term "set region" means three-dimensional space extending in the projection direction from the central part, and the shape of the set region may be any shape. For example, when the central part is a point, the set region is a straight line. When the central part is a circle, the set region is a cylinder or a truncated cone (the set region is a cylinder in the case of parallel projection or the like in which the viewpoint of the projection image is set to infinity).

Further, the center of rotation in the present invention may be any point as long as the point is obtained, based on a rotation center candidate region, in the rotation center candidate region or in the vicinity thereof. It is desirable that the center of rotation is a center of gravity. Further, the center of rotation may be set outside of the observation target, or on the surface of the observation target, or inside of the observation target. Further, the center of rotation may be obtained by weighting based on information about each voxel, such as the voxel value of a voxel, constituting the rotation center candidate region.

The rotation center candidate region is an overlapped region in which the set region and the observation target intersect with each other. The overlapped region may be detected as a region or plural regions.

When plural overlapped regions are detected, all of the detected plural overlapped regions may be determined as the rotation center candidate region. Alternatively, a part of the detected plural overlapped regions may be determined as the rotation center candidate region. In the present invention, when there are plural overlapped regions, the candidate region determination means may exclude an overlapped region the size of which is less than or equal to a predetermined size from the rotation center candidate region. Further, the predetermined size may be a distance of the overlapped region from the boundary surface or the boundary point of the observation target on the viewpoint side of the projection image.

The entire region of an overlapped region may be determined as the rotation center candidate region. Alternatively, a part of an overlapped region may be determined as the rotation center candidate region. For example, a part of the overlapped region may be a boundary surface or a boundary point of the observation target on a viewpoint side of the projection image. Further, a part of the overlapped region may be a region in which a region extending in the predetermined projection direction from a boundary surface or a boundary point of the observation target on a viewpoint side of the projection image by a predetermined distance and the overlapped region intersect with each other.

According to a rotation center determination apparatus, method and program of an image display apparatus of the present invention, a projection image is generated from a three-dimensional image by projecting an observation target in a predetermined projection direction, and the generated projection image is displayed at a center of a display screen of a display device, and a region extending in the predetermined projection direction from a central part of the display screen is set as a set region, and at least a part of an overlapped region between the set region, which has been set, and the observation target is determined as a rotation center candidate region, and a center of rotation is determined in the determined rotation center candidate region or in the vicinity thereof. Therefore, a user can easily determine a center of rotation in a rotation center candidate region based on a region of interest or in the vicinity of the rotation center candidate region only by performing observation while arranging the region of interest at the center of the display screen, and the user does not need to perform a complicated operation for setting a center of rotation. Here, it is estimated that a user observes an observation target while arranging a region of interest of the user at a center of a display screen. Therefore, the probability that a center of rotation is automatically set in the region of interest is high if the user simply performs conventional operations of moving an observation region of an observation target in parallel and displaying the moved observation region. Hence, the user can recognize the observation target more accurately.

When a part of the overlapped region is a boundary surface or a boundary point of the observation target on a viewpoint side of the projection image, it is possible to determine the center of rotation based on the boundary surface or the boundary point of the observation target on the viewpoint side of the projection image. Therefore, it is possible to determine the center of rotation on the boundary surface of the observation target on the viewpoint side of the projection image or the vicinity of the boundary surface, or the boundary point.

When a part of the overlapped region is a region in which a region extending in a predetermined projection direction from a boundary surface or a boundary point of the observation target on a viewpoint side of the projection image by a predetermined distance and the overlapped region intersect with each other, it is possible to determine the center of rotation based on the boundary surface or the boundary point of the observation target on the viewpoint side of the projection image. It is possible to determine the center of rotation in the region in which a region extending in a predetermined projection direction from a boundary surface or a boundary point of the observation target on a viewpoint side of the projection image by a predetermined distance and the overlapped region intersect with each other, or in the vicinity of the intersecting region, without performing a complicated operation for setting a center of rotation.

Further, the candidate region determination means may exclude an overlapped region the size of which is less than or equal to a predetermined size from the rotation center candidate region when there are plural overlapped regions. That is because it is possible to estimate that an overlapped region of the plural overlapped regions the size of which is less than or equal to a predetermined size is not a region of interest based on an assumption that the user observes the observation target in such a manner that the region of interest of the user is magnified in a predetermined size or larger at the center of the display screen. Therefore, it is possible to prevent erroneous determination of a center of rotation in a very small region, in which the user has no interest, when the very small region and the region of interest of the user are detected as the plural overlapped regions, without performing a complicated operation of setting the center of rotation.

BRIEF DESCRIPTION OF THE DRAWINGS

FIG. 1 is a functional block diagram of a rotation center determination apparatus according to a first embodiment of the present invention;

FIG. 2 is a flow chart illustrating a flow of rotation center determination processing in the first embodiment;

FIG. 7 is a flow chart illustrating a flow of rotation center determination processing in the second embodiment.

DESCRIPTION OF THE PREFERRED EMBODIMENTS

Figure 3A:
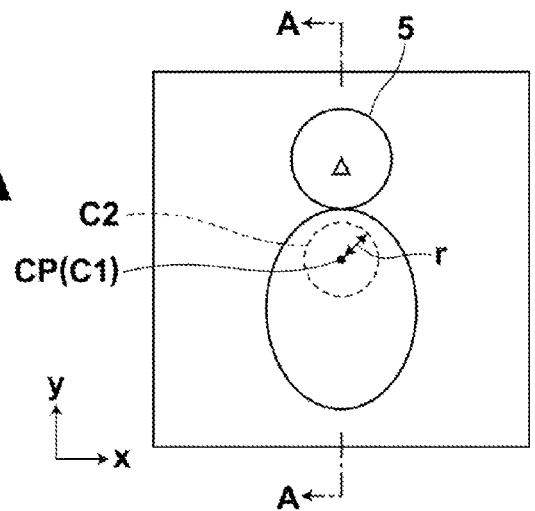
FIG. 3A is a front view of a subject in the first embodiment.

Hereinafter, embodiments of an image display apparatus, an image display program and an image display method according to the present invention will be described in detail with reference to drawings. The present invention may be applied to various fields in which a two-dimensional image generated based on a three-dimensional image is rotated and displayed. Here, the present invention will be described based on a case in which the present invention is applied to image-based diagnosis in medical fields.

FIG. 1 is a schematic diagram illustrating the configuration of an image display apparatus realized by installing an image display program at a workstation used by a doctor. An image display apparatus 1 includes a processor and a memory (which are not illustrated), as standard workstation elements. Further, a storage 2, such as an HDD (Hard Disk Drive) and an SSD (Solid State Drive), is provided. A display 3 and an input device 4, such as a mouse and a keyboard, are connected to the image display apparatus 1.

An image display program and data to which the image display program refers are stored in the storage 2 at the time of installation, and downloaded into a memory at boot time. The image display program defines three-dimensional image obtainment processing, image generation processing, display control processing, candidate region determination processing and rotation center determination processing, as processing performed by a CPU.

Further, when the CPU performs the aforementioned processing as defined by the program, the general-purpose workstation functions as a three-dimensional image obtainment means 11 that obtains a three-dimensional image representing an observation target, an image generation means 12 that generates a projection image from the three-dimensional image by projecting the observation target in a predetermined projection direction, a display control means 13 that displays the generated projection image at a center of the display screen of a display device, a candidate region determination means 14 that sets, as a set region, a region extending in the predetermined projection direction from a central part of the display screen, and that determines, as a rotation center candidate region, at least a part of an overlapped region between the set region, which has been set, and the observation target, and a rotation center determination means 15 that determines the center of rotation in the determined rotation center candidate region or in the vicinity thereof.

The storage 2 stores a three-dimensional image transferred from an examination section in charge of imaging, or an endoscope image and a three-dimensional image retrieved from a database. The three-dimensional image may be directly output from a multi-slice CT apparatus, or the like. Alternatively, the three-dimensional image may be reconstructed from a group of two-dimensional slice data output from a conventional CT apparatus, or the like.

When the image display apparatus 1 detects selection of a predetermined diagnosis assistance function in a selection menu, the image display apparatus 1 prompts a user to select or input necessary information for specifying a three-dimensional image. When a three-dimensional image is specified by a user's operation, a corresponding three-dimensional image is loaded from the storage 2 into the memory.

Here, it is assumed that a multi-slice CT apparatus performed imaging and three-dimensional image V including patient's information was obtained in an examination of a patient, and that the obtained three-dimensional image V has been stored in a database, which is not illustrated. When a user selects a volume rendering display function, and inputs an identifier of the patient and an examination date, the corresponding three-dimensional image V is obtained, and stored in the storage 2. Further, the rotation center determination method of the present invention is performed.

Figure 3B:
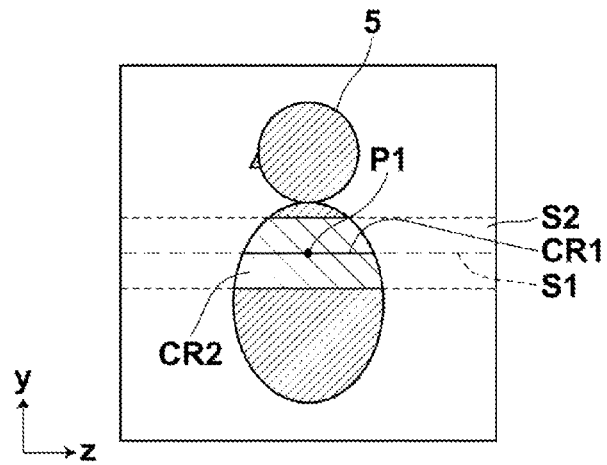
FIG. 3B is a cross section at A-A in FIG. 3A in the first embodiment.
Figure 3C:
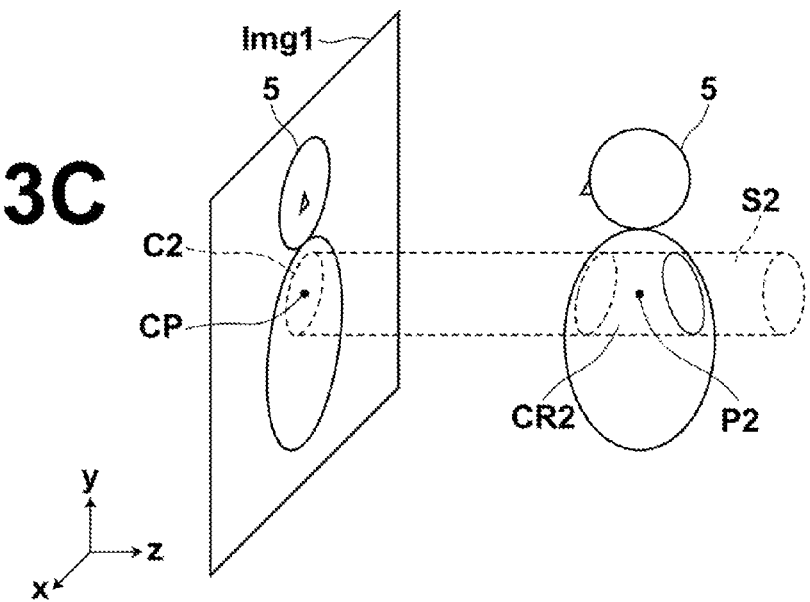
FIG. 3C is a perspective view of FIG. 3A in a modified example of the first embodiment.

FIG. 2 is a flow chart illustrating a preferred embodiment of an image display control method of the present invention. FIG. 3A is a front view of a subject (human body) 5, which is an observation target, and FIG. 3B is a cross section at A-A in FIG. 3A. FIG. 3C is a perspective view of the subject 5. The image display control method of the present embodiment will be described with reference to FIGS. 2, 3A, 3B and 3C.

First, the three-dimensional image obtainment means 11 obtains three-dimensional image V representing the subject 5, which is an observation target, the three-dimensional image V having been obtained by tomography by a CT apparatus, from the storage 2 (S01).

Further, the image generation means 12 generates projection image Img1 from the three-dimensional image V by projecting the subject 5 in a predetermined projection direction (S02). Here, a volume rendering image is generated, as the projection image Img1, by using a known method.

The display control means 13 displays the generated volume rendering image Img1 on the display 3, as illustrated in FIG. 3A (S03). Here, it is assumed that the display control means 13 moves, based on an input by a user's manual operation using an input device, the volume rendering image in parallel on the display screen of the display 3, and the volume rendering image Img1, illustrated in FIG. 3A, is displayed on the display screen.

Next, with reference to FIGS. 3A through 3C, processing by the candidate region determination means 14 of the present embodiment will be described in detail by using the human body 5, which is an observation target, as an example.

First, the candidate region determination means 14 sets, as a set region, a region extending in a predetermined projection direction from central part C1 of a projection image (S04). In the present embodiment, the candidate region determination means 14 sets, as set region S1, a straight line extending in the projection direction from central point C1 by using, as the central part C1, central point CP on the display screen of the projection image Img1, as illustrated in FIGS. 3A and 3B. This projection direction is a direction, toward the central point C1, from a viewpoint that was determined in advance when the volume rendering image Img1 was generated.

Further, as illustrated in FIG. 3B, the candidate region determination means 14 extracts an overlapped region between the set region and the observation target (S05). When an overlapped region is present (S06 is Y), the candidate region determination means 14 determines, as a rotation center candidate region, at least a part of the overlapped region (S07). In the first embodiment of the present invention, a segment that is an overlapped region between straight line S1 and the human body 5 is determined as rotation center candidate region CR1. When an overlapped region between the set region and the observation target is not present (S06 is N), parallel movement of the display position is waited for (S09).

The rotation center determination means 15 determines a center of rotation in the determined rotation center candidate region CR1 or in the vicinity thereof, as illustrated in FIG. 3B. In the first embodiment of the present invention, the rotation center determination means 15 determines, as center P1 of rotation, the center of gravity of the rotation center candidate region CR1 (S08). Specifically, the center of gravity of segment CR1 is determined as center P1 of rotation, as illustrated in FIG. 3B.

In this state, when a user specifies a rotation direction by an input device 4, for example, such as a mouse, the display control means 13 determines a rotation axis that includes center P1 of rotation and that is orthogonal to the specified rotation direction and parallel to a projection plane, and displays a three-dimensional image rotated based on the determined rotation axis.

After then, when the display control apparatus moves, based on an input by a user's manual operation at an input device, the display position in parallel from the current display position of the projection image on the display screen (S09 is Y), the image display apparatus 1 repeats steps from S04 to S08. In contrast, when the image display apparatus 1 has not moved the display position of the projection image corresponding to the determined center of rotation in parallel from the current display position on the display screen (S09 is N), and observation is continued (S10 is N), the set center of rotation is maintained, and parallel movement of the display position on the display screen by the display control means 13 is waited for. When the display control means 13 has not moved the display position of the projection image corresponding to the determined center of rotation in parallel from the current display position on the display screen (S09 is N), and observation is ended (S10 is Y), the image control method of the present embodiment is ended.

According to the first embodiment of the present invention, a user can easily determine a center of rotation in a rotation center candidate region based on a region of interest or in the vicinity of the rotation center candidate region without performing a complicated operation for setting a center of rotation. The user only needs to arrange the region of interest of the observation target at a center of the display screen during observation. It is estimated that the user observes an observation target while arranging a region of interest of the user at a center of a display screen. Therefore, the probability that a center of rotation is automatically set in the region of interest is high if the user performs just a conventional operation of displaying an observation region of an observation target that has been moved in parallel. Hence, the user can recognize the observation target more accurately. Further, it is possible to display the rotated image while the rotation center candidate region of the observation target arranged at the center of the display screen is continued to be arranged substantially in the vicinity of the center of the display screen. Unlike the case of rotating an image based on a predetermined center of rotation, the observation target displayed with its center located at a center of the display screen does not move from the center of the display screen by rotation. Therefore, it is possible to easily recognize the observation target and the center of rotation of the observation target.

Further, in the first embodiment of the present invention, a segment that is an overlapped region of straight line S1 and the observation target 5 is determined as rotation center candidate region CR1, and the center of gravity of the rotation center candidate region CR1 is determined as center P1 of rotation. Therefore, it is possible to display the observation target 5 rotated with respect to the center of gravity of a segment traversing the observation target 5, and the segment being formed by a straight line that directs in a projection direction from a central part of the display screen and that traverses the observation target 5. The user can easily recognize the observation target and the position of the center of rotation by intuition.

Further, in the first embodiment, the observation target is a human body, and the rotation center determination method of the present embodiment has been applied to image-based diagnosis of a medical image of a subject. Therefore, the aforementioned advantageous effects are greatly achievable in medical fields in which detailed observation of a lesion of a patient or the like from various angles is necessary.

Next, a modified example of the first embodiment will be described.

As a modified example of set region S1, in steps S04 through S08, the candidate region determination means 14 may set, as central part C2, a circle having radius r with its center located at central point CP of the display screen of projection image Img1, and set, as set region S2, a cylinder extending in the projection direction from the central part C2, as illustrated in FIGS. 3A, 3B and 3C. Further, the candidate region determination means 14 may determine, as rotation center candidate region CR2, an overlapped region between the cylinder S2 and the human body 5, as illustrated in FIG. 3B. Further, the rotation center determination means 15 may determine, as center P2 of rotation, the center of gravity of the rotation center candidate region CR2, as illustrated in FIG. 3C. Here, it is assumed that the center P1 of rotation in the first embodiment and the center P2 of rotation are different points. Here, the projection direction is a direction from viewpoint VP that was set in advance at infinity from a projection plane at the time of generation of the volume rendering image Img1 toward each voxel constituting the circle C2 having radius r with its center located at the central point CP. The direction is parallel with respect to each voxel constituting the circle C2 having radius r with its center located at the central point CP.

In the above case, it is possible to display the observation target 5 rotated with respect to the center of gravity of a region traversing the observation target 5, and the region being formed by a cylinder that directs in a projection direction from a central part of the display screen and traverses the observation target 5. Therefore, a user can easily recognize an observation target and the position of the center of rotation of the observation target by intuition.

Here, the set region is not limited to a cylinder and a straight line. The set region may be any region extending in a projection direction from a central part. For example, when the central part is a circle, and a center projection method is adopted, a direction from the viewpoint of the projection image toward each voxel constituting the central part spreads in conic shape. Therefore, the set region is a truncated cone.

Figure 4:
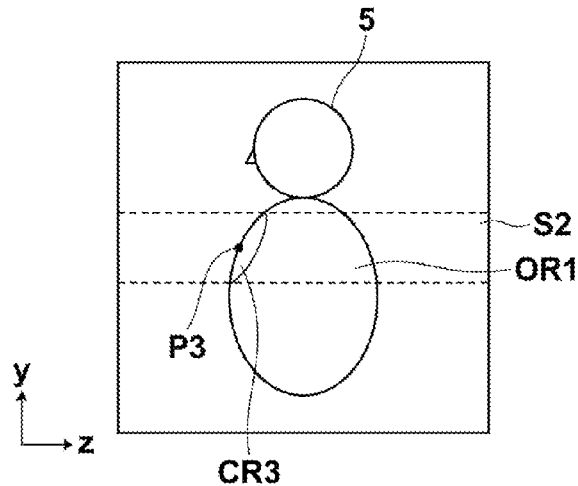
FIG. 4 is a side view of FIG. 3A in a different modified example of the first embodiment.

As a modified example of the candidate region, a part of an overlapped region may be set as rotation center candidate region Rc. FIG. 3A is a front view of the subject 5, and FIG. 4 is a side view of the subject 5. It is assumed that the front view of FIG. 3A is displayed, as projection image Img1, on a display screen. For example, as illustrated in FIG. 3A, the candidate region determination means 14 may set, as central part C2, a circle having radius r with its center located at central point CP of the projection image Img1 on the display screen. Further, the candidate region determination means 14 may set, as set region S2, a cylinder extending in a projection direction from the central part C2. Further, as illustrated in FIG. 4, the candidate region determination means 14 may set, as rotation center candidate region CR3, a boundary surface closest to the viewpoint along the projection direction in overlapped region OR1 between the set region S2 and the subject 5. Further, the candidate region determination means 14 may set, as rotation center P3, the center of gravity of the boundary surface CR3. Alternatively, the candidate region determination means 14 may set, as a central part, central point CP on the display screen of the projection image Img1, and set, as a set region, a straight line extending in a projection direction from the central part CP. Further, the candidate region determination means 14 may set, as a rotation center candidate region, a point (boundary point) closest to the viewpoint along the projection direction in overlapped region between the set region and the subject 5. Further, the candidate region determination means 14 may set the boundary point, as a center of rotation.

As described above, when a part of the overlapped region is used as a boundary surface or a boundary point of the observation target on the viewpoint side of the projection image, it is possible to determine the center of rotation based on the boundary surface or the boundary point of the observation target on the viewpoint side of the projection image. Further, it is possible to determine the center of rotation in the boundary surface of the observation target on the viewpoint side of the projection image and the vicinity of the boundary surface. In such cases, it is possible to display a rotated image while a boundary surface or a boundary point of the observation target arranged and displayed at a center of the display screen is kept arranged substantially in the vicinity of the center. Therefore, when the surface of the observation target is observed from various angles by rotating the observation target, or the like, it is possible to easily recognize the observation target and the center of rotation of the observation target.

Figure 5A:
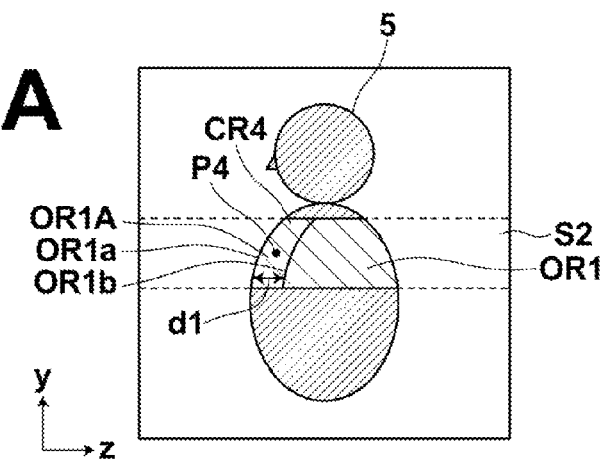
FIG. 5A is a cross section at A-A in FIG. 3A in another modified example of the first embodiment.
Figure 5B:
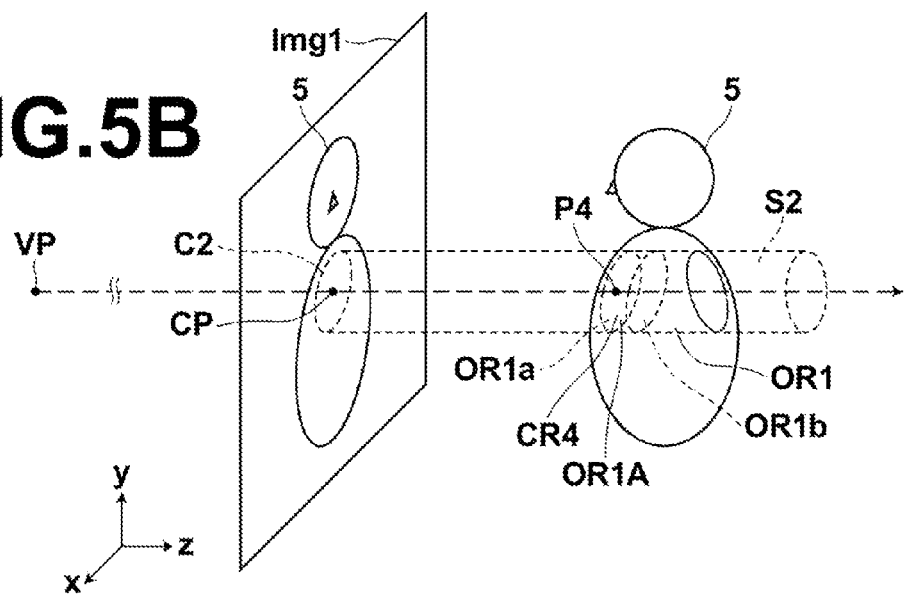
FIG. 5B is a perspective view of FIG. 3A in another modified example of the first embodiment.

Further, another example in which a part of an overlapped region is used as rotation center candidate region Rc will be described with reference to FIGS. 3A, 5A and 5B. FIG. 3A is a front view of a subject, and FIG. 5A is a cross section at A-A in FIG. 3A. FIG. 5B is a perspective view of the subject of FIG. 5A. As illustrated in FIGS. 3A and 5A, the candidate region determination means 14 sets, as central part C2, a circle having radius r with its center located at central point CP of the display screen of projection image Irag1. Further, the candidate region determination means 14 sets, as set region S2, a cylinder extending in a projection direction from the central part C2. Further, as illustrated in FIGS. 3A, 5A and 5B, the candidate region determination means 14 sets, as rotation center candidate region CR4, a region formed by an intersection between region OR1A and overlapped region OR1. The region OR1A extends only by predetermined distance d1 in the projection direction from the boundary surface OR1a of the observation target on the viewpoint side of the projection image Img1. Further, the candidate region determination means 14 may determine, as center P4 of rotation, the center of gravity of the rotation center candidate region CR4. Specifically, the region OR1A may be calculated, as a region between the boundary surface OR1a and boundary surface OR1b in the overlapped region OR1, by calculating the boundary surface OR1b. The boundary surface OR1b is composed of voxels located at positions to which each of voxels constituting the boundary surface OR1a of the subject 5 on the viewpoint side of the projection image is moved by predetermined distance d1. Here, the projection direction is a direction from viewpoint VP that was set in advance at infinity from the projection plane at the time of generation of the volume rendering image Img1 toward each voxel constituting the boundary surface OR1a, as illustrated in FIG. 5B. The projection direction is parallel with respect to each voxel. Alternatively, central point CP of the display screen of the projection image Img1 may be set as a central part, and a straight line extending in a projection direction from the central part CP may be set as a set region. Further, a segment extending by predetermined distance d1 from the boundary point closest to the viewpoint side along the projection direction in the overlapped region between the set region and the subject 5 may be set as a rotation center candidate region. Further, the center of gravity of the segment extending by predetermined distance d1 from the boundary point closest to the viewpoint side along the projection direction may be set as a center of rotation.

As described above, when a region in which a region extending in a predetermined projection direction from a boundary surface or a boundary point of the observation target on a viewpoint side of the projection image by a predetermined distance and the overlapped region intersect with each other is used as a part of the overlapped region, it is possible to determine the center of rotation based on the boundary surface or the boundary point of the observation target on the viewpoint side of the projection image. Therefore, it is possible to determine the center of rotation in the region in which a region extending in a predetermined projection direction from a boundary surface or a boundary point of the observation target on a viewpoint side of the projection image by a predetermined distance and the overlapped region intersect with each other, or in the vicinity thereof. In such a case, it is possible to display a rotated image while a predetermined range from a boundary surface of the observation target that is arranged at the center of the display screen is kept arranged substantially in the vicinity of the center. Therefore, when the vicinity of the boundary surface of the observation target is rotated and observable from various angles, it is possible to easily recognize the observation target and a center of rotation of the observation target.

Here, when a part of the overlapped region is used as rotation center candidate region Rc, it is not necessary that the part of the overlapped region is determined as described in the aforementioned example. The part of the overlapped region may be determined by using any method based on the observation target and the purpose of observation as long as it is a part of the overlapped region.

Next, a second embodiment will be described. When there are plural overlapped regions, the candidate region determination means 14 in the second embodiment excludes an overlapped region the size of which is less than or equal to a predetermined size from the rotation center candidate region. Each component and processing in function blocks of the second embodiment is the same as that of the first embodiment except that a function for excluding an overlapped region of plural overlapped regions the size of which is less than or equal to a predetermined size from the rotation center candidate region is added in the second embodiment.

Figure 6A:
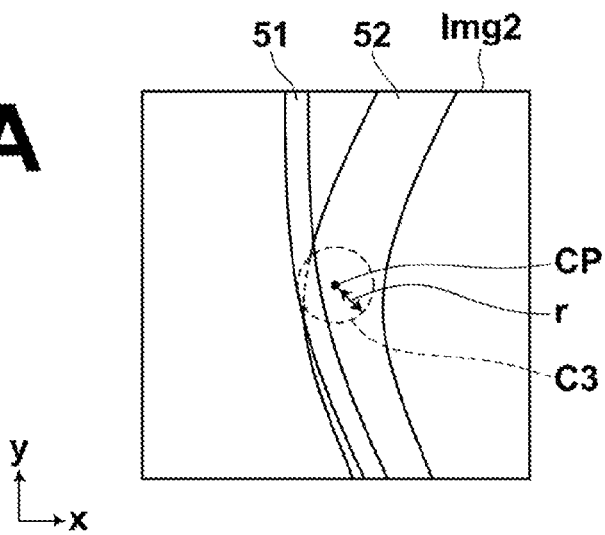
FIG. 6A is a front view of an observation target in a second embodiment.
Figure 6B:
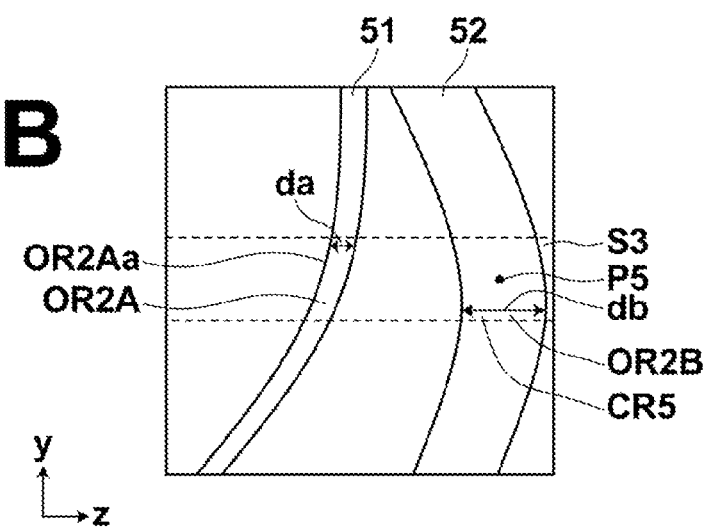
FIG. 6B is a side view of FIG. 6A in the second embodiment.

FIG. 6A is a front view illustrating a micro blood vessel 51 that is an observation target and a blood vessel 52. FIG. 6B is a side view of FIG. 6A. It is assumed that the front view illustrated in FIG. 6A is displayed, as projection image Img2, on a display screen. FIG. 7 is a flow chart illustrating the flow of processing in the second embodiment corresponding to steps S04 through S06 illustrated in FIG. 2 in the first embodiment. The processing in the second embodiment is similar to that of the first embodiment except for the processing illustrated in FIG. 7. Processing of the second embodiment will be described by using FIGS. 2, 6A, 6B and 7.

First, in a similar manner to the first embodiment, the three-dimensional image obtainment means 11 obtains a three-dimensional image representing a micro blood vessel 51 and a blood vessel obtained by CT radiography from the storage 2 (S01). Further, the image generation means 12 generates volume rendering image Img2 by projecting the obtained three-dimensional image in a predetermined direction (S02). The display control means 13 displays the generated volume rendering image Img2 on the display 3 (S03). Here, it is assumed that the display control means 13 moves, on the display screen of the display 3, the projection image in parallel based on an input by a user's manual operation at an input device, and that the volume rendering image Img2 illustrated in FIG. 6A is displayed on the display screen.

As illustrated in FIGS. 6A, 6B, the candidate region determination means 14 sets, as central part C3, a circle having radius r with its center located at central point CP of the display screen of the projection image Img2, and sets, as set region S3, a cylinder extending in a projection direction from the central part C3 (S21). Here, the projection direction is a direction from viewpoint VP that was set in advance at infinity from the projection plane at the time of generation of the volume rendering image Img2 toward each voxel constituting circle C3 having radius r with its center located at central point P. The projection direction is parallel with respect to each voxel constituting circle C3 having radius r with its center located at central point P.

Further, as illustrated in FIG. 6B, the candidate region determination means 14 extracts overlapped region OR2A between the set region S3 and the micro blood vessel 51, which is an observation target, and overlapped region OR2B, which is an observation target, between the set region S3 and the blood vessel 52 (S22).

Further, when an overlapped region is present (S23 is Y), and there are plural overlapped regions (S24 is Y), the candidate region determination means 14 calculates sizes of the overlapped regions OR2A, OR2B with respect to the overlapped regions OR2A, OR2B, respectively (S25). In the second embodiment of the present invention, the candidate region determination means 14 calculates the maximum length in the projection direction, as the size of an overlapped region. The maximum length in the projection direction of the overlapped region OR2A is calculated by calculating a distance of the overlapped region in the projection direction from each voxel constituting boundary surface OR2Aa of the observation target on the viewpoint side of the projection image, and by calculating the maximum one of the calculated distances in the projection direction from the respective voxels.

Next, the candidate region determination means 14 compares the calculated maximum length in the projection direction of the overlapped region OR2A with predetermined threshold d2. If the maximum length da in the projection direction of the overlapped region OR2A is less than or equal to the predetermined threshold d2, the candidate region determination means 14 excludes the overlapped region OR2A from rotation center candidate region CR5. Here, it is assumed that the maximum length da in the projection direction of the overlapped region OR2A is less than or equal to the predetermined threshold d2, and the candidate region determination means 14 excludes the overlapped region OR2A from the rotation center candidate region CR5. With respect to the overlapped region OR2B, the candidate region determination means 14 similarly performs calculation of maximum length db in the projection direction of the overlapped region OR2B and comparison of the maximum length db with predetermined threshold d2. Here, it is assumed that the maximum length db in the projection direction of the overlapped region OR2B is greater than the predetermined threshold d2. Therefore, the candidate region determination means 14 does not exclude the overlapped region OR2B from the rotation center candidate region CR5. Consequently, the candidate region determination means 14 determines the overlapped region OR2B of the plural overlapped regions OR2A, OR2B, which was not excluded, as the rotation center candidate region CR5 (S26).

In contrast, when an overlapped region is not present (S23 is N), the candidate region determination means 14 waits for parallel movement of the display position in a manner similar to the first embodiment (S09). When only one overlapped region is detected (S23 is Y, and S24 is N), the candidate region determination means 14 determines the extracted overlapped region, as rotation center candidate region CR5 (S26).

Further, the candidate region determination means 14 determines the center of gravity of the rotation center candidate region CR5, as center P5 of rotation (S06). Steps S07 and S08 after this step are the same as those of the first embodiment. Therefore, explanations will be omitted.

According to the second embodiment, when it is assumed that a user is observing an observation target by enlarging a region of interest of the user to a predetermined size or greater and by displaying the region of interest at a center of a display screen, it is possible to estimate that an overlapped region of plural overlapped regions the size of which is less than or equal to a predetermined size is not a region of interest. Therefore, when a very small region in which the user is not interested and a region of interest of the user are detected as plural overlapped regions, it is possible to prevent erroneous determination of a center of rotation in the very small region.

Further, even when only one overlapped region is detected, the size of the overlapped region may be calculated, if the size of the overlapped region is less than or equal to a predetermined size, the overlapped region may be excluded. Alternatively, when only one overlapped region is detected, the center of gravity of the one overlapped region may be determined as a center of rotation, irrespective of the size of the overlapped region.

Here, when an overlapped region of plural overlapped regions the size of which is less than or equal to a predetermined size is excluded from the rotation center candidate region, judgment as to whether the size is less than or equal to the predetermined size may be made by using any method as long as the judgment is made based on the size of the overlapped region, and the judgment may be regulated by various definitions.

For example, judgment as to whether the size of a region is less than or equal to a predetermined size may be made by judging whether the length of an overlapped region in X axis direction, or Y axis direction or Z axis direction, or the length of the overlapped region in a projection direction is less than or equal to a predetermined threshold. Alternatively, a predetermined cross section that traverses an overlapped region may be set, and an overlapped region, the area of which on the predetermined cross section is less than or equal to a predetermined threshold, may be judged as a region less than or equal to the predetermined size. Further, various known methods may be used for judgment.

Here, when judgment is made as to whether the size of an overlapped region is a predetermined size or less based on the length of the overlapped region in a predetermined direction, such as X, Y, Z axis directions, and a projection direction, or the area of the overlapped region, or the volume of the overlapped region, if the overlapped region is enlarged to a large size and displayed on the display screen, it is desirable that the overlapped region is determined as a rotation center candidate region even if the length of the overlapped region in a predetermined direction or the volume of the overlapped region is small. If an overlapped region is reduced to a small size and displayed on the display screen, it is desirable that the region is excluded from the rotation center candidate region.

For example, in the case of parallel projection, it is desirable that a predetermined size is changed based on the magnification ratio of an observation target. For example, in the case of parallel projection, the predetermined size may be a value obtained by multiplying a predetermined threshold and an inverse number of a magnification ratio together. Further, for example, in the case of center projection, the predetermined size may be changed based on a distance between a viewpoint and an overlapped region. For example, the predetermined size may be a value obtained by multiplying a predetermined threshold and a minimum distance of distances between a viewpoint and each voxel constituting an overlapped region together.

Accordingly, even if the length of the overlapped region in a predetermined direction or the volume of the overlapped region is small, if an enlarged image of the overlapped region is displayed on a display screen, the probability that the overlapped region is a region of interest of a user is high. Therefore, such a region may be determined as a rotation center candidate region. It is possible to determine, as a rotation center candidate, a center of rotation of only an observation target in which a user is estimated to be highly interested. Therefore, the possibility that a center of rotation is determined even more based on what the user is interested in is high.

Further, when plural overlapped regions have been detected, instead of judging whether the maximum length in the projection direction of the overlapped region is less than or equal to predetermined distance d2, judgment may be made as to whether the minimum length in the projection direction of the overlapped region is less than or equal to the predetermined distance d2.

Further, when plural overlapped regions have been detected, all of the detected plural overlapped regions may be determined as rotation center candidate regions. Alternatively, a part of the detected plural overlapped regions may be determined as rotation center candidate region or regions.

Further, as in the embodiments in the specification of the present application, an observation target in a three-dimensional image obtained by tomography may be extracted by using a known extraction method. For example, with respect to each voxel of volume data, a region composed of voxels the opacities of which are higher than a certain threshold may be extracted as an observation target, and the opacities being used to generate a projection image by using a volume rendering method. Alternatively, a region that has been judged to be an inside in an inside/outside test for generating a projection image from volume data by using a surface rendering method may be used as an observation target.

When the observation target is an anatomical structure of a human body, a region extracted by using a known technique for extracting an anatomical structure may be used as an observation target.

For example, as a technique for extracting by computer-aided image-based diagnosis (CAD: Computer Aided Diagnosis), techniques disclosed in Japanese Unexamined Patent Publication No. 2001-137230 and Japanese Unexamined Patent Publication No. 2008-253293 may be used for the lung field. Further, techniques disclosed in Japanese Unexamined Patent Publication No. 2001-283191 and Japanese Unexamined Patent Publication No. 2002-345807 may be used for extraction of the liver. The technique disclosed in Japanese Unexamined Patent Publication No. 2008-043564 may be used for bones, and the technique disclosed in Japanese Unexamined Patent Publication No. 2004-141612 may be used for the heart. Further, other organ recognition techniques are adoptable as long as an organ to which a specified position of a lesion belongs is extractable.

Further, the observation target may be a lesion, such as an abnormal shadow, in a medical image. An abnormal shadow may be manually extracted. Alternatively, a lesion region may be automatically detected by performing computer-aided image-based diagnosis (CAD: Computer Aided Diagnosis), in which an abnormal shadow candidate is automatically detected by computer processing.

As techniques for detecting a lesion region, the following techniques may be adopted. Specifically, techniques for detecting a lung cancer disclosed in Japanese Unexamined Patent Publication No. 2003-225231, Japanese Unexamined Patent Publication No. 2003-271924, and K. Kubota et al., "Evaluation of Computer-Aided Diagnosis system for Lung Cancer based on Helical CT images", Technical Report of IEICE, Vol. 101, No. 310, pp. 41-46, 2001 are applicable. Further, detection techniques of diffuse lung diseases, such as consolidation, Ground-Glass Opacity (GGO) Crazy-Paving, honeycomb-shaped shadow, pulmonary emphysema shadow and particle-shaped shadow, disclosed in S. Kido et al., "Intelligent CAD for diffuse lung diseases", Grant-in-Aid for Scientific Research, granted by the Ministry of Education, Culture, Sports, Science and Technology, Study in Specific Field, "Intellectual Diagnosis Aid of Multi-Dimensional Medical Images", Proceedings of 4th Symposium, pp. 45-54, 2007 are applicable. Further, a technique for detecting a liver cancer disclosed in Y. Wakida et al., "Liver Cancer Detection based on a Temporal Density Feature from Abdominal Dynamic X-ray CT Images", Proceedings of Journal of Computer Aided Diagnosis of Medical Images, Vol. 10, No. 1, pp. 1-10, 2007 is applicable. Further, a technique for detecting hepatocellular carcinoma, hepatic cyst, hepatic hemangioma, bleeding in a liver region and bleeding in a brain region disclosed in H. Fujita et al., "Intelligent Computer-aided Diagnosis Based on Normal Structure Recognition of Human Body", Grant-in-Aid for Scientific Research, granted by the Ministry of Education, Culture, Sports, Science and Technology, Study in Specific Field, "Intellectual Diagnosis Aid of Multi-Dimensional Medical Images", Proceedings of 4th Symposium, pp. 55-60, 2007 is applicable. Further, a technique for detecting an abnormality in a blood vessel, as disclosed in Japanese Unexamined Patent Publication No. 2004-329929, a technique for detecting an abnormal shadow candidate, as disclosed in Japanese Unexamined Patent Publication No. 10(1998)-097624, which was filed by the applicant of this application, and a technique for detecting a calcified region, as disclosed in Japanese Unexamined Patent Publication No. 8(1996)-215183, may be used.

Instead of manually moving a region of interest of an observation target to a center of a display screen, a region-of-interest extraction means may be further provided. The region-of-interest extraction means automatically extracts a region of interest, such as an organ and a lesion, by using the aforementioned techniques or the like. Further, a region-of-interest movement means for displaying an image in which a region of interest extracted by the display control means has been moved to a center of the display screen may be provided. In this case, it is possible to perform the rotation center determination processing of the present invention with respect to a projection image in which the region of interest of the observation target is automatically arranged at a center of the display screen. Therefore, a user can display the region of interest in the center of the display only by performing an operation for extracting the region of interest of the observation target. Further, it is possible to automatically determine a center of rotation in the region of interest or in the vicinity of the region of interest. Therefore, it is possible to easily determine a center of rotation with respect to the region of interest. Further, since it is possible to automatically determine the center of rotation in the region of interest or in the vicinity of the region of interest, it is possible to more accurately recognize the region of interest.

Further, a central part of the display screen may be a region having a predetermined size, such as a polygon and an ellipse, besides a point and a circle. It is desirable that the central part is, for example, a circle or an ellipse with its center located at the central point of the display screen, and that the area of the central part is less than or equal to ¼ of that of the display screen. It is more desirable that the central part is a circle or an ellipse the area of which is less than or equal to ⅕ of that of the display screen.

When a three-dimensional image has been generated by CG, or the like, an observation target may be specified by using information for extracting an object in the three-dimensional image defined in the process of generating the three-dimensional image. The observation target may be specified by using various known methods.

In the specification of the present application, the center of rotation may be any point as long as the point is obtainable, based on a rotation center candidate region, in the rotation center candidate region or in the vicinity thereof. It is desirable that the center of rotation is a center of gravity. Further, the center of rotation may be set outside of the observation target. Alternatively, the center of rotation may be set on the surface of the observation target, or inside of the observation target. Further, the center of rotation may be obtained by performing weighting based on information about each voxel, such as the voxel value of a voxel constituting the rotation center candidate region.

Each of the aforementioned embodiments was described only as an example. Therefore, none of the descriptions should be used to interpret the scope of technical scope of the present invention in a limited manner.

Further, the system configuration, the hardware configuration, the process flow, the module configuration, a user interface, a specific processing content, and the like may be modified in various manners without departing from the gist of the present invention. Such modifications are still in the technical scope of the present invention.

The three-dimensional image may be obtained by tomography or the like, and formed. Alternatively, the three-dimensional image may be virtually generated by CG. Further, the observation target may be anything as long as it can be represented in a three-dimensional image. For example, the observation target may be a human body, or an animal or plant, or a geometric figure, or a structure, such as a building and a machine, or a landform, such as a three-dimensional map, or the like. A modality used in tomography may be anything, such as a CT, an MRI and an ultrasonic imaging device, as long as tomography is possible.

Further, the image display apparatus 1 may be configured by plural computers, as means to which the functions of the image display apparatus 1 are allotted. Further, any known device may be adopted as a device, such as an input device and a display, constituting the system. For example, a joystick may be adopted instead of a mouse, and a touch panel may be adopted instead of a display.

What is claimed is:

1. An image display apparatus comprising:
a three-dimensional image obtainment unit that obtains a three-dimensional image representing an observation target;
an image generation unit that generates a projection image from the three-dimensional image by projecting the observation target in a predetermined projection direction;
a display control unit that displays the generated projection image on a display screen of a display device;
a movement input reception unit that receives user movement input for moving the display position of the projection image on the display screen to thereby allow the user to manually move the display position of the projection image for placing the projection image at a vicinity of a center on the display screen;
a candidate region determination unit that sets, as a set region, a region extending in the predetermined projection direction from a central part of the display screen, and that determines, as a rotation center candidate region, at least a part of an overlapped region between the set region and the observation target, wherein the overlapped region is determined when an overlapped region between the set region and the observation target, which projects the projection image at the display position moved by receiving the movement input from the movement input reception unit, is present; and
a rotation center determination unit that determines a center of rotation in the determined rotation center candidate region or in the vicinity thereof, the center of rotation being determined, within the rotation center candidate region, after the candidate region determination unit establishes the presence of the overlapped region,
wherein i) the movement input reception unit receiving the user movement input moving the display position of the projection image on the display screen and ii) the candidate region determination unit establishing the presence of the overlapped region and then setting the rotation center candidate region are performed repeatedly, and after the candidate region determination unit determines the rotation center candidate region, the rotation center determination unit determines the center of rotation.

2. An image display apparatus, as defined in claim 1, wherein the center of rotation is the center of gravity of the rotation center candidate region.

3. An image display apparatus, as defined in claim 1, wherein the projection image is a volume rendering image or a surface rendering image.

4. An image display apparatus, as defined in claim 1, wherein the part of the overlapped region is a boundary surface or a boundary point of the observation target on a viewpoint side of the projection image.

5. An image display apparatus, as defined in claim 1, wherein the part of the overlapped region is a region in which a region extending in the predetermined projection direction from a boundary surface or a boundary point of the observation target on a viewpoint side of the projection image by a predetermined distance intersects with the overlapped region.

6. An image display apparatus, as defined in claim 1, wherein the candidate region determination unit excludes an overlapped region the size of which is less than or equal to a predetermined size from the rotation center candidate region when there are plural overlapped regions.

7. An image display apparatus, as defined in claim 6, wherein the predetermined size is a distance of the overlapped region from a boundary surface or a boundary point of the observation target on the viewpoint side of the projection image.

8. An image display apparatus, as defined in claim 1, wherein the observation target is a human body.

9. An image display method performed by an image display apparatus, the method comprising the steps of:
  obtaining a three-dimensional image representing an observation target;
  generating a projection image from the three-dimensional image by projecting the observation target in a predetermined projection direction;
  displaying the generated projection image on a display screen of a display device;
  receiving, from a movement input reception unit, manual movement input from a user for moving the display position of the projection image on the display screen to thereby allow the user to manually move the display position of the projection image for placing the projection image at a vicinity of a center on the display screen;
  setting, as a set region, a region extending in the predetermined projection direction from a central part of the display screen, and determining, as a rotation center candidate region, at least a part of an overlapped region between the set region and the observation target, wherein the overlapped region is determined when an overlapped region between the set region and the observation target, which projects the projection image at the display position moved by receiving the movement input, is present; and
  after establishing the presence of the overlapped region and determining the rotation center candidate region, determining a center of rotation in the determined rotation center candidate region or in the vicinity thereof,
  wherein i) the step of receiving, from the movement input reception unit and ii) the step of establishing the presence of the overlapped region and then setting the rotation center candidate region are performed repeatedly, and after the rotation center candidate region is determined, the center of rotation is determined.

10. A non-transitory computer-readable storage medium storing therein an image display program for causing a computer to function as:
  a three-dimensional image obtainment unit that obtains a three-dimensional image representing an observation target;
  an image generation unit that generates a projection image from the three-dimensional image by projecting the observation target in a predetermined projection direction;
  a display control unit that displays the generated projection image on a display screen of a display device;
  a movement input reception unit that receives user movement input for moving the display position of the projection image on the display screen to thereby allow the user to manually move the display position of the projection image for placing the projection image at a vicinity of a center on the display screen;
  a candidate region determination unit that sets, as a set region, a region extending in the predetermined projection direction from a central part of the display screen, and that determines, as a rotation center candidate region, at least a part of an overlapped region between the set region and the observation target, wherein the overlapped region is determined when an overlapped region between the set region and the observation target, which projects the projection image at the display position moved by receiving the movement input from the movement input reception unit, is present; and
  a rotation center determination unit that determines a center of rotation in the determined rotation center candidate region or in the vicinity thereof, the center of rotation being determined, within the rotation center candidate region, after the candidate region determination unit establishes the presence of the overlapped region,
  wherein i) the movement input reception unit receiving the user movement input moving the display position of the projection image on the display screen and ii) the candidate region determination unit establishing the presence of the overlapped region and then setting the rotation center candidate region are performed repeatedly, and after the candidate region determination unit determines the rotation center candidate region, the rotation center determination unit determines the center of rotation.

* * * * *